(12) United States Patent
Senda

(10) Patent No.: US 8,606,191 B2
(45) Date of Patent: Dec. 10, 2013

(54) RADIO COMMUNICATION SYSTEM, RADIO TERMINAL, RADIO BASE STATION, CONTROLLER DEVICE AND RADIO COMMUNICATION METHOD

(75) Inventor: Mitsuharu Senda, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/259,073

(22) PCT Filed: Mar. 24, 2010

(86) PCT No.: PCT/JP2010/055128
§ 371 (c)(1),
(2), (4) Date: Mar. 12, 2012

(87) PCT Pub. No.: WO2010/110344
PCT Pub. Date: Sep. 30, 2010

(65) Prior Publication Data
US 2012/0157138 A1 Jun. 21, 2012

(30) Foreign Application Priority Data
Mar. 24, 2009 (JP) .................................. 2009-072471

(51) Int. Cl.
| H04B 17/00 | (2006.01) |
| H04B 15/00 | (2006.01) |
| H04B 7/00 | (2006.01) |
| H04W 36/00 | (2009.01) |
| H04W 4/00 | (2009.01) |

(52) U.S. Cl.
USPC ....... 455/67.11; 455/63.1; 455/522; 455/440; 370/331

(58) Field of Classification Search
USPC ........ 455/63.1, 63.3, 63.4, 67.11, 67.13, 447, 455/500, 501, 522, 436, 437, 440, 441; 370/331
See application file for complete search history.

(56) References Cited

U.S. PATENT DOCUMENTS

| 5,276,907 A | * | 1/1994 | Meidan ......................... 455/436 |
| 6,078,814 A | * | 6/2000 | Jeffries et al. ................. 455/447 |

(Continued)

FOREIGN PATENT DOCUMENTS

| JP | 2004-207840 A | 7/2004 |
| JP | 2007-074288 A | 3/2007 |

(Continued)

OTHER PUBLICATIONS

Notice of Reasons for Refusal dated Jan. 8, 2013, issued in counterpart Japanese application No. 2011-506103.

(Continued)

*Primary Examiner* — Christopher M Brandt
(74) *Attorney, Agent, or Firm* — Procopio, Cory, Hargreaves & Savitch LLP

(57) ABSTRACT

A controller device receives power information and location information from a first radio base station, the power information indicating, for each frequency, the power of the signal arriving at a radio terminal in the communication area of the first radio base station from a second radio base station, and the location information indicating the location of the radio terminal. The controller device is provided with an identifying unit which, based on the power information and location information received from the first radio base station, identifies an interference location and identifies an interference frequency, the interference location being the location where the power of the signal arriving at the communication area is greater than or equal to a predetermined value, and the interference frequency being the frequency of the signal arriving at the interference location.

3 Claims, 8 Drawing Sheets

(56) References Cited

U.S. PATENT DOCUMENTS

| | | | | |
|---|---|---|---|---|
| 6,167,240 | A * | 12/2000 | Carlsson et al. | 455/67.13 |
| 6,546,058 | B1 * | 4/2003 | Gilhousen et al. | 375/285 |
| 6,564,057 | B1 * | 5/2003 | Chun et al. | 455/437 |
| 2002/0002052 | A1 * | 1/2002 | McHenry | 455/447 |
| 2002/0051487 | A1 * | 5/2002 | Yamada et al. | 375/232 |
| 2002/0111163 | A1 * | 8/2002 | Hamabe | 455/425 |
| 2003/0157897 | A1 * | 8/2003 | Maeda et al. | 455/67.3 |
| 2004/0005897 | A1 * | 1/2004 | Tomoe et al. | 455/450 |
| 2004/0121774 | A1 * | 6/2004 | Rajkotia et al. | 455/441 |
| 2004/0198235 | A1 * | 10/2004 | Sano | 455/69 |
| 2005/0048979 | A1 | 3/2005 | Chun et al. | |
| 2007/0015511 | A1 * | 1/2007 | Kwun et al. | 455/436 |
| 2007/0019575 | A1 * | 1/2007 | Shaheen | 370/310 |
| 2008/0139231 | A1 * | 6/2008 | Jalil et al. | 455/509 |
| 2009/0005052 | A1 * | 1/2009 | Abusch-Magder et al. | 455/446 |
| 2009/0168722 | A1 * | 7/2009 | Saifullah et al. | 370/331 |
| 2009/0312039 | A1 * | 12/2009 | Zou et al. | 455/456.6 |
| 2010/0184458 | A1 * | 7/2010 | Fodor et al. | 455/522 |
| 2010/0296410 | A1 * | 11/2010 | Kazmi et al. | 370/252 |

FOREIGN PATENT DOCUMENTS

| | | |
|---|---|---|
| JP | 2008-252359 A | 10/2008 |
| JP | 2008-288932 A | 11/2008 |
| WO | 2006/106382 A1 | 10/2006 |
| WO | 2009/011065 A1 | 1/2009 |

OTHER PUBLICATIONS

Notification of Reasons for Refusal dated Jul. 10, 2012, issued in counterpart Japanese Application No. 2011-506103.

International Search Report and Written Opinion dated Apr. 20, 2010 issued by the Japanese Patent Office for International Application No. PCT/JP2010/055128.

3rd Generation Partnership Project (3GPP), "Technical Specification Group Radio Access Network; Evolved Universal Terrestrial Radio Access (E-UTRA); Physical layer procedures (Release 8)", URL: http//www.3gpp.org/ftp/Specs/archive/36_series/36.213/36213-830.zip.

Supplementary European Search Report dated Mar. 7, 2013 issued by European Patent Office for counterpart European Application No. EP 10 75 6140.

3rd Generation Partnership Project; Technical Specification Group Radio Access Network; Evolved Universal Terrestrial Radio Access (E-UTRA); Physical layer procedures (Release 8). May 2008, F06921 Sophia-Antipolis Cedex; France.

Decision of Refusal dated Jun. 18, issued in counterpart Japanese Application No. 2011-506103.

Decision for Dismissal of an Amendment dated Jun. 18, 2013, issued in counterpart Japanese Application No. 2011-506103.

Telecom Italia, "Preliminary analysis on use cases and UE measurements for minimisation of drive tests", 3GPP TSG-RAN WG2 #65bis, R2-092435, dated Mar. 23, 2009.

* cited by examiner

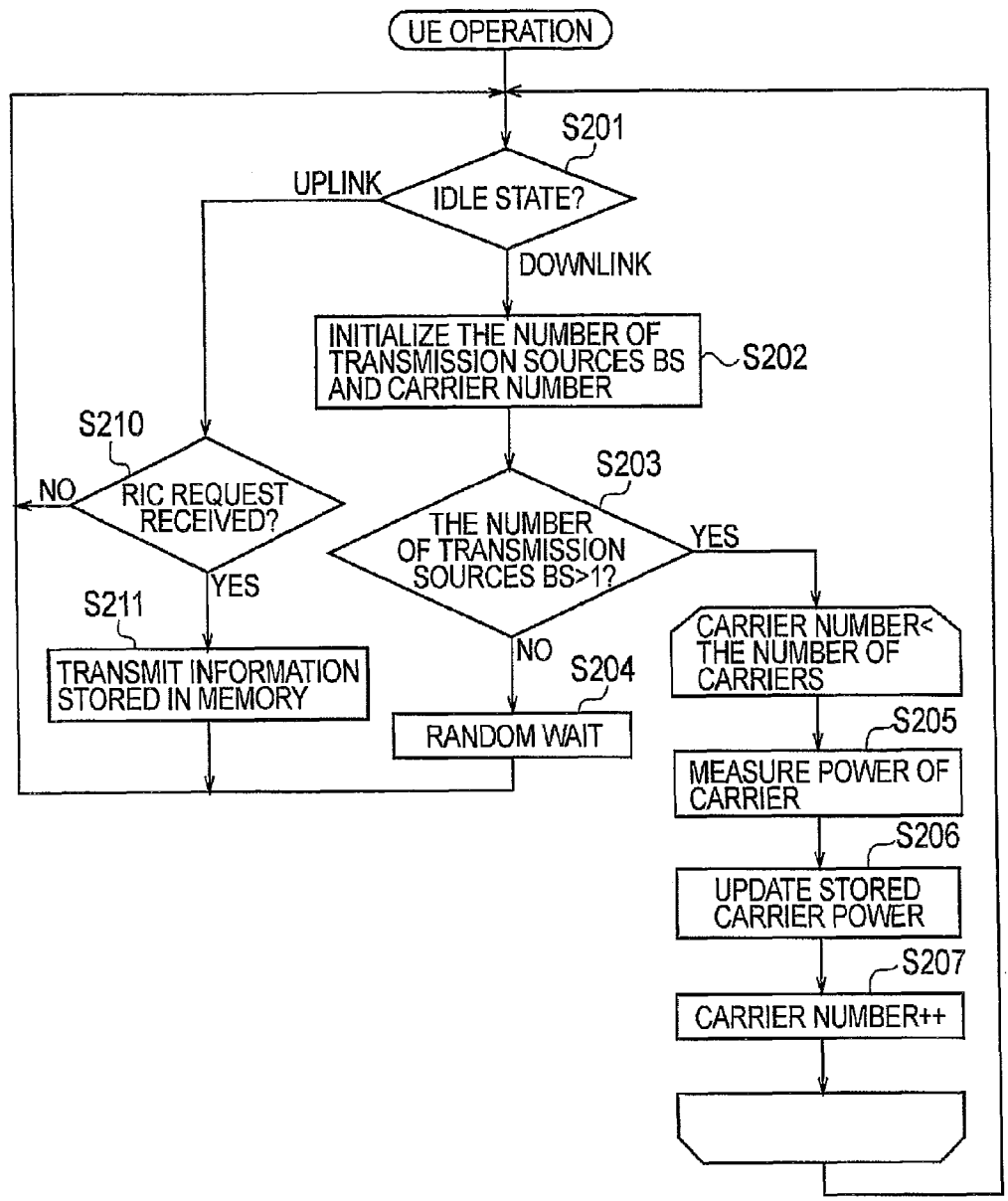

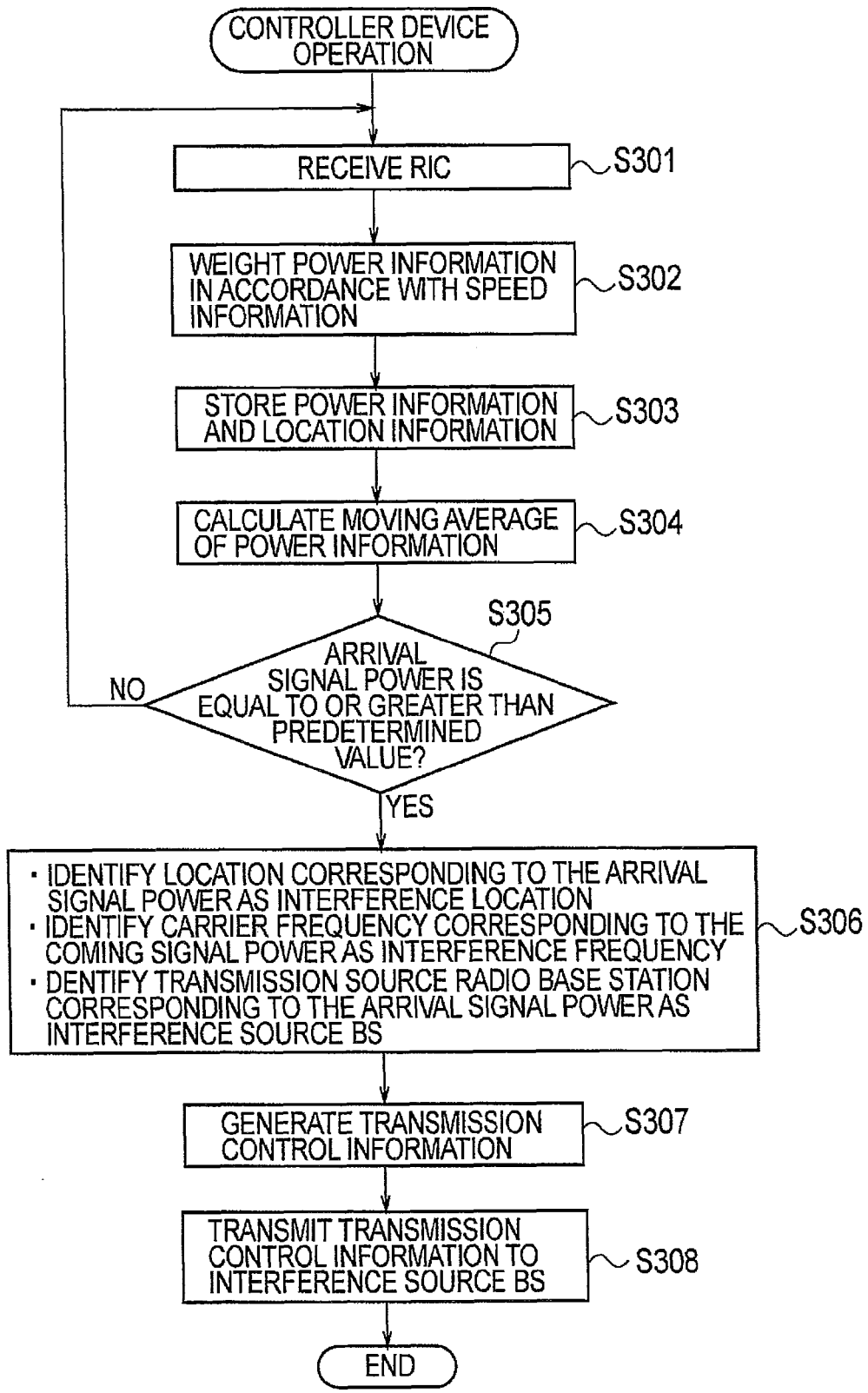

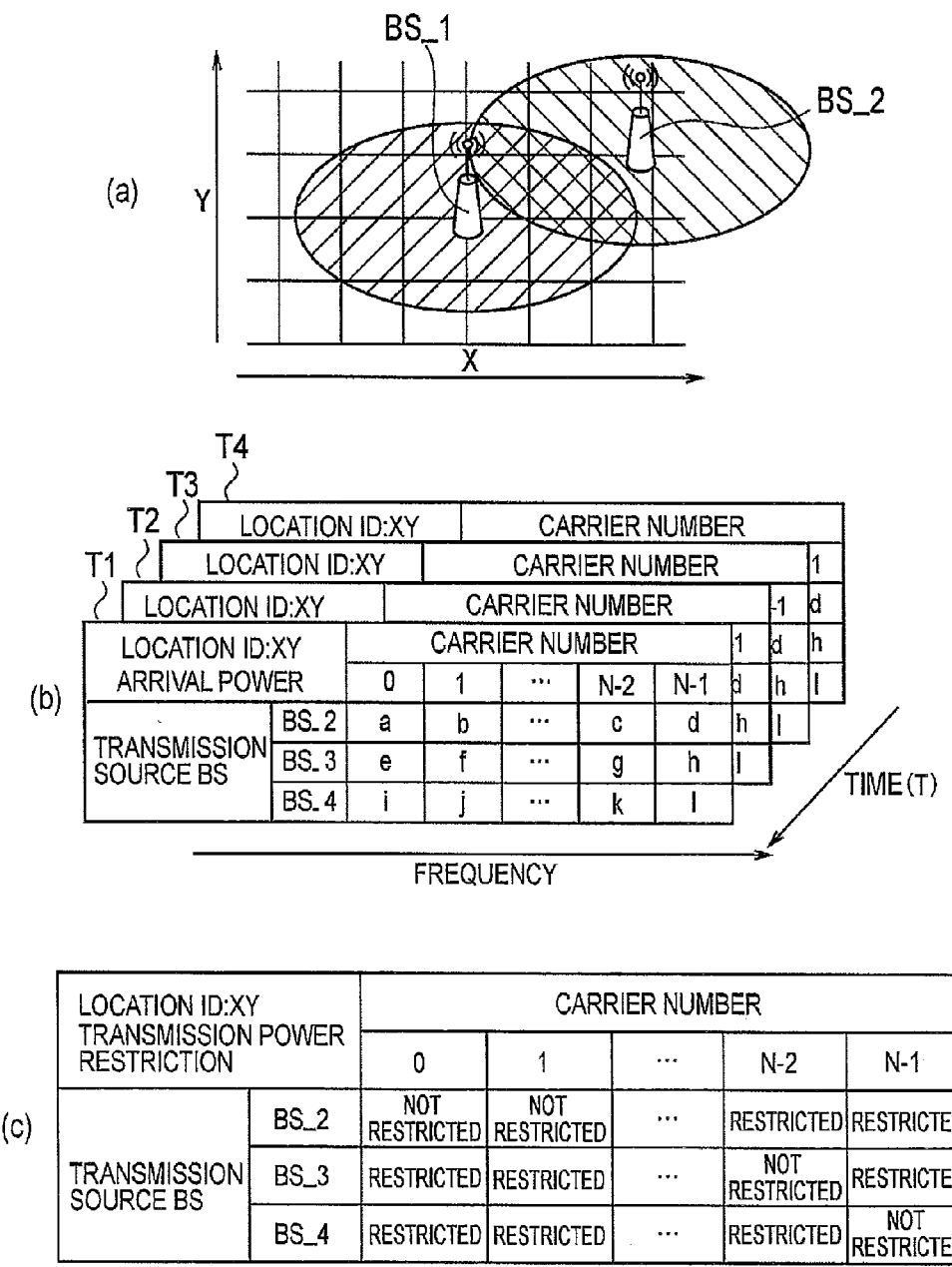

RADIO COMMUNICATION SYSTEM, RADIO TERMINAL, RADIO BASE STATION, CONTROLLER DEVICE AND RADIO COMMUNICATION METHOD

TECHNICAL FIELD

The present invention relates to a radio communication system in which adjacent radio base stations use the same frequency, and also relates to a radio terminal, a radio base station, a controller device and a radio communication method.

BACKGROUND ART

In general, a cellular radio communication system covers a wide service area by dividing the wide service area into units of communication areas called cells and equipping each of the communication areas with a radio base station in charge of radio communications with a radio terminal in the communication area.

Meanwhile, in radio communication systems based on one-cell frequency reuse, i.e., in radio communication systems in which adjacent radio base stations use the same frequency, a radio terminal located in an edge of the communication area (cell edge) is mainly affected by interference from a radio base station in an adjacent communication area (hereinafter, an adjacent base station), and therefore has the throughput of in the downlink communications reduced.

For the radio communication systems of the aforementioned kind, there are known a method to avoid the interference by designing the communication areas strictly, a method to avoid the interference by adjusting antenna tilt angles and the like at the time of installing the radio base stations (hereinafter, a first background art).

Furthermore, a method called frequency scheduling is known (hereinafter, a second background art). In the frequency scheduling, a frequency with which a radio terminal is less affected by the interference from an adjacent radio base station is allocated to the radio terminal. To put it more specifically, the radio terminal measures a reception quality (received SINR, for example) for each frequency and then reports a CQI (Channel Quality Indicator) indicating the measurement result to the radio base station. The radio base station allocates a frequency less affected by the interference from an adjacent radio base station to the radio terminal in accordance with the reported CQI (refer to Non-PATENT DOCUMENT 1).

PRIOR ART DOCUMENT

Non-Patent Document

Non-PATENT DOCUMENT 1: 3GPP TS 36.213 V8.3.0, [online], URL: http://www.3gpp.org/ftp/Specs/archive/36_series/36.213/362 13-830.zip

SUMMARY OF INVENTION

The aforementioned first background art and second background art have the following problems, however.

In the first background art, even though the communication system can avoid the interference at the time of the installation of a radio base station, but if the propagation environment changes after the installation of a radio base station, there is no way to adapt the communication system to the propagation environment after the change. The problem is, for example, that, if an architectural structure such as a building is built or demolished after the installation of the radio base station, or if a new adjacent radio base station is installed, it is no longer possible to avoid the interference.

In the second background art, in a situation where the amount of traffic due to transmission and reception by the radio base station is large, e.g., in a case where the radio base station performs radio communications with a large number of radio terminals, the frequencies allocatable to these radio terminals run short. In this case, the radio base station has to allocate a frequency largely influenced by the interference from an adjacent radio base station to the radio terminal. Thus, there is a problem that the interference cannot be avoided.

In this respect, an objective of the present invention is to provide a radio communication system, a radio terminal, a radio base station, a controller device and a radio communication method with which the interference from an adjacent base station can be avoided even in a case where the propagation environment changes after the installation of a radio base station or in a case where the allocatable frequencies run short.

In order to solve the problems described above, the present invention has the following features. First of all, according to a first feature of the present invention, there is provided a radio communication system comprising: a first radio base station (e.g. radio base station BS_D) configured to use a plurality of predetermined frequencies (carrier frequencies) for downlink communications; a radio terminal (e.g. radio terminal UE_C) located in a communication area (e.g. communication area AR_D) of the first radio base station and connected to the first radio base station; a second radio base station (e.g. radio base station BS_B, radio base station BS_C, radio base station BS_E) configured to use the plurality of frequencies for downlink communications; and a controller device (controller device 300) configured to control the first radio base station and the second radio base station, wherein the first radio base station transmits, to the controller device, power information indicating an arrival signal power for each of the frequencies from the second radio base station to the radio terminal, and location information indicating a location of the radio terminal in the communication area, and the controller device comprises: an identification unit (identification unit 321) configured to identify an interference location and an interference frequency on the basis of the power information and the location information received from the first radio base station, the interference location being a location where the arrival signal power is equal to or greater than a predetermined value in the communication area, the interference frequency being the frequency of an arrival signal at the interference location; and a controller transmitter (wired communication unit 310) configured to transmit, to the second radio base station, transmission control information for reducing the arrival signal power related to the interference location and the interference frequency identified by the identification unit.

According to the aforementioned feature, it is possible to provide the radio communication system capable of avoiding the interference from the adjacent base station (second radio base station) or the like even in a case where the propagation environment changes after the installation of the radio base station or in a case where the allocatable frequencies run short.

A second feature of the present invention is related to the first feature and is summarized as follows. The transmission control information indicates the interference frequency identified by the identification unit, and the second radio base station reduces a transmission power of a signal to be transmitted by use of the interference frequency, on the basis of the transmission control information received from the controller device.

A third feature of the present invention is related to the first feature and is summarized as follows. The second radio base station includes an array antenna including a plurality of antennas (antennas ANT1 to ANTn), the transmission control information indicates the interference location identified by the identification unit or a direction of the interference location, and the second radio base station directs a directional beam formed by the array antenna to a direction different from the direction of the interference location, on the basis of the transmission control information received from the controller device.

A fourth feature of the present invention is related to the first feature and is summarized as follows. The second radio base station includes a plurality of sector antennas (antennas ANT1 to ANTn) having transmission directivities in different directions, respectively, the transmission control information indicates the interference location identified by the identification unit or a direction of the interference location, and the second radio base station reduces a transmission power of a signal to be transmitted by use of a sector antenna corresponding to the direction of the interference location, on the basis of the transmission control information received from the controller device.

A fifth feature of the present invention is related to the first feature and is summarized as follows. The transmission control information indicates the interference frequency identified by the identification unit, and the second radio base station stops using the interference frequency, on the basis of the transmission control information received from the controller device.

A sixth feature of the present invention is related to the first feature and is summarized as follows. The identification unit identifies a location where a moving average of the arrival signal powers is equal to or greater than a predetermined value as the interference location.

A seventh feature of the present invention is related to the first feature and is summarized as follows. The first radio base station transmits, to the controller device, speed information indicating a moving speed of the radio terminal in addition to the power information and the location information, and the identification unit identifies the interference location with the arrival signal powers weighted by use of the speed information received from the first radio base station.

According to an eighth feature of the present invention, there is provided a radio terminal (radio terminal UE) located in a communication area of a first radio base station that uses a predetermined plurality of frequencies for downlink communications and connected to the first radio base station, the radio terminal comprising: a power information generator (power information generator 131) configured to generate power information indicating an arrival signal power of each of the frequencies to the radio terminal from a second radio base station that is installed within a predetermined range from the first radio base station and that uses the plurality of frequencies for downlink communications; a location information generator (location information generator 132) configured to generate location information indicating a location of the radio terminal; and a terminal transmitter (radio communication unit 110) configured to transmit, to the first radio base station, the power information generated by the power information generator and the location information generated by the location information generator.

According to a ninth feature of the present invention, there is provided a radio base station (radio base station BS) configured to use a predetermined plurality of frequencies for downlink communications, the radio base station comprising: a base-station receiver (radio communication unit 210) configured to receive, from a radio terminal in a communication area of the radio base station, power information indicating an arrival signal power of each of the frequencies to the radio to terminal from a different radio base station that uses the plurality of frequencies for downlink communications, and location information indicating a location of the radio terminal; and a base-station transmitter (wired communication unit 240) configured to transmit the power information and the location information, which are received by the base-station receiver, to a controller device (controller device 300) configured to control the radio base station and the different radio base station.

According to a tenth feature of the present invention, there is provided a controller device (controller device 300) configured to control a first radio base station that uses a plurality of predetermined frequencies for downlink communications, and a second radio base station that uses the plurality of frequencies for downlink communications, the controller device comprising: a controller receiver (wired communication unit 310) configured to receive, from the first radio base station, power information indicating an arrival signal power of each of the frequencies to a radio terminal in a communication area of the first radio base station from the second radio base station, and location information indicating a location of the radio terminal; an identification unit (identification unit 321) configured to identify an interference location and an interference frequency on the basis of the power information and the location information, which are received from the first radio base station, the interference location being a location where the arrival signal power is equal to or greater than a predetermined value in the communication area, and the interference frequency being a frequency of an arrival signal at the interference location; and a controller transmitter (wired communication unit 310) configured to transmit, to the second radio base station, transmission control information for reducing the arrival signal power related to the interference location and the interference frequency identified by the identification unit.

According to an eleventh feature of the present invention, there is provided a radio communication method comprising the steps of: transmitting, from a first radio base station to a radio terminal in a communication area of the first radio base station, a transmission request for power information and location information, the power information indicating an arrival signal power of each frequency to the radio terminal, the location information indicating a location of the radio terminal; receiving the transmission request from the first radio base station by the radio terminal; transmitting the power information and the location information from the radio terminal to the first radio base station; and the power information and the location information from the radio terminal by the first radio base station.

According to a twelfth feature of the present invention, there is provided a radio communication method comprising the steps of: transmitting, from a first radio base station to a controller device configured to control the first radio base station and the second radio base station, power information and location information, the power information indicating an arrival signal power of each frequency to a radio terminal in a communication area of the first radio base station, the location information indicating a location of the radio terminal; receiving the power information and the location information from the first radio base station by the controller device; and transmitting by the controller device, transmission control information for reducing the arrival signal power to the second radio base station on the basis of the power information and the location information received from the first radio base station.

According to the present invention, it is possible to provide a radio communication system, a radio terminal, a radio base station, a controller device and a radio communication method with which the interference from an adjacent base station can be avoided even in a case where the propagation environment changes after the installation of a radio base station or in a case where the allocatable frequencies run short.

BRIEF DESCRIPTION OF DRAWINGS

FIG. 7 is a flowchart showing an operation flow of the radio terminal according to the embodiment of the present invention.

FIG. 8 is a flowchart showing an operation flow of the controller device according to the embodiment of the present invention.

FIG. 9 is a diagram for describing a specific operation example of the controller device according to the embodiment of the present invention.

DESCRIPTION OF EMBODIMENTS

Next, a description will be given of (1) Outline of Radio Communication System, (2) Detailed Configuration of Radio Communication System, (3) Operation of Radio Communication System, (4) Operation and Effect and (5) Other Embodiments with reference to the drawings.

In the following description of the drawings, same or similar reference signs denote same or similar elements and portions.

(1) Outline of Radio Communication System

Figure 1:
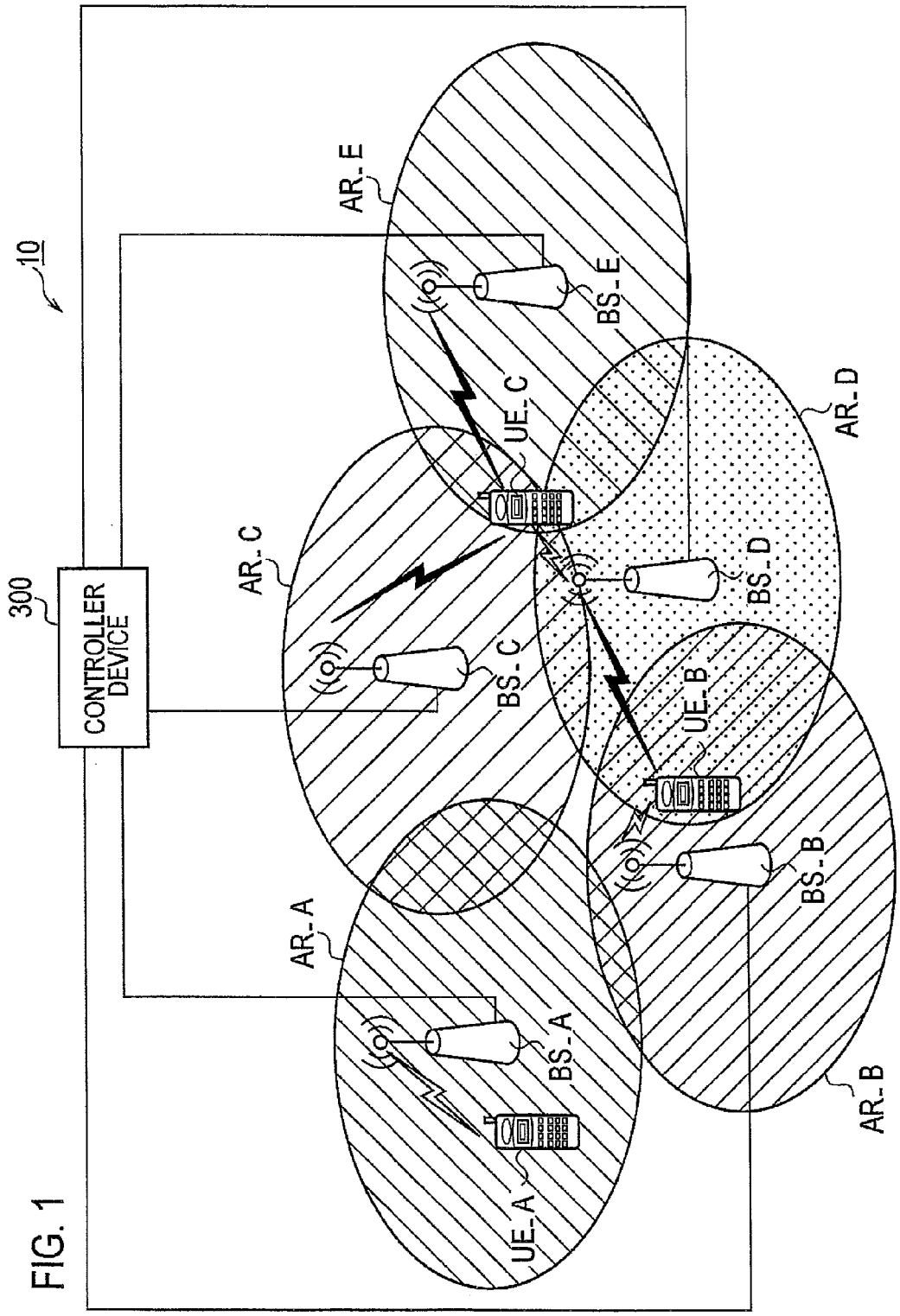
FIG. 1 is an overall configuration diagram of a radio communication system according to an embodiment of the present invention.

FIG. 1 is an overall configuration diagram of a radio communication system 10 according to an embodiment of the present invention.

The radio communication system 10 has a configuration based on LTE (Long Term Evolution), which is standardized in 3GPP (3rd Generation Partnership Project) or based on WiMAX, which is standardized in IEEE 802.16, for example. In this embodiment, downlink communications will be mainly described.

In the radio communication system 10, a wide service area is covered by dividing the wide service area into units of communication areas each of which is called a cell and then installing in each of the communications areas a radio base station to be in charge of performing radio communications with a radio terminal in the communication area.

In the example shown in FIG. 1, a radio base station BS_A, a radio base station BS_B, a radio base station BS_C, a radio base station BS_D and a radio base station BS_E respectively form a communication area AR_A, a communication area AR_B, a communication area AR_C, a communication area AR_D and a communication area AR_E in the radio communication system 10. In the radio communication system 10 based on one-cell frequency reuse, the radio base station BS_A to the radio base station BS_E use the same frequency.

The radio communication system 10 employs an orthogonal frequency division multiple access (OFDMA) scheme, which is one of multi-carrier communication schemes. In the OFDMA scheme, a channel called a subchannel is formed by use of multiple subcarriers orthogonal to each other, and then, a radio base station allocates the channel to a radio terminal. Hereinafter, the frequency of a channel, which is allocated to a radio terminal, is called a "carrier frequency."

A radio terminal UE_A in the communication area AR_A is wirelessly connected to the radio base station BS_A. The radio terminal UE_A receives a desired signal coming from the radio base station BS_A (refer to FIG. 2(a)).

A radio terminal UE_B located in an overlapping portion of the communication area AR_B and the communication area AR_D is wirelessly connected to the radio base station BS_B. The radio terminal UE_B receives an interference signal coming from the radio base station BS_D, in addition to a desired signal coming from the radio base station BS_B (refer to FIG. 2(b)).

A radio terminal UE_C located in an overlapping portion of the communication area AR_C, the communication area AR_D and the communication area AR_E is wirelessly connected to the radio base station BS_D. The radio terminal UE_C receives interference signals coming respectively from the radio base stations BS_C and BS_E, in addition to a desired signal coming from the radio base station BS_D (refer to FIG. 2(c)).

Figure 2:
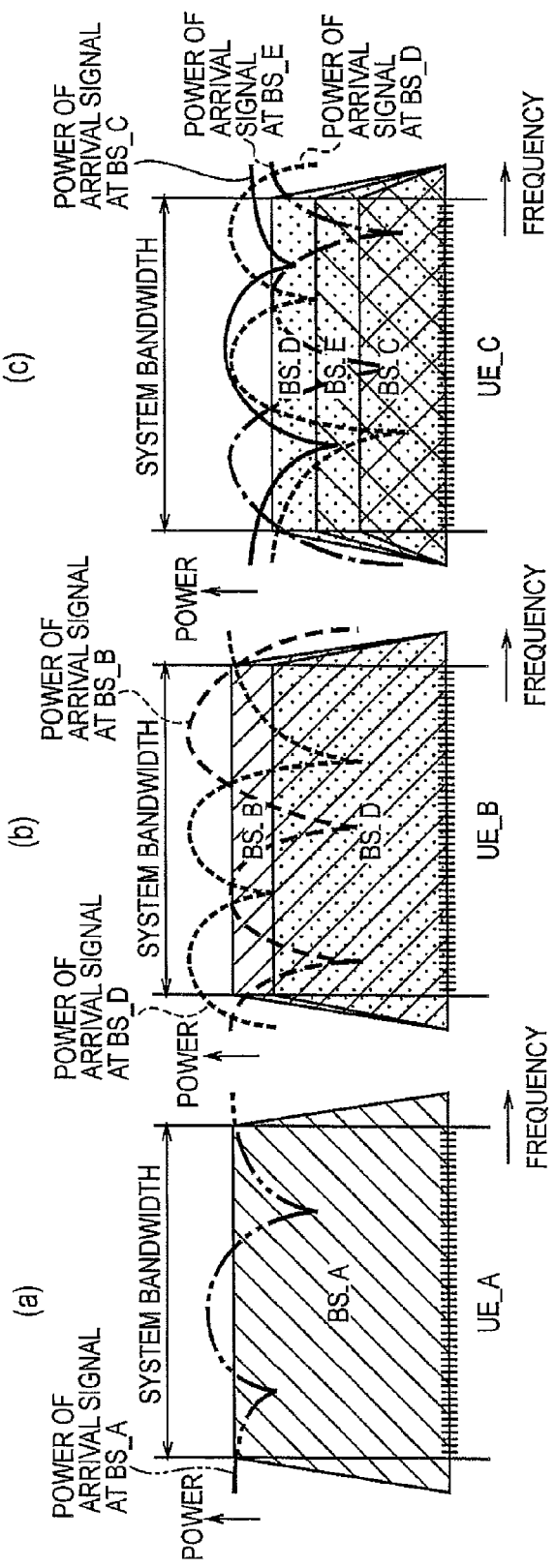
FIG. 2 is a diagram for describing propagation environments in the radio communication system according to the embodiment of the present invention.

As shown in FIGS. 2(a) to 2(c), the powers of arrival signals respectively at the radio base stations BS_A to BS_E are different for each carrier frequency because of the influence of frequency selective fading.

The radio base stations BS_A to BS_E are each connected to a controller device 300. The controller device 300 is a server provided on a back-haul network, which is a wired communication network, and configured to control the radio base stations BS_A to BS_E.

Note that, the radio base stations BS_A to BS_E are collectively termed as a "radio base station BS" as appropriate in the following description. The radio terminals UE_A to UE_C are also collectively termed as a "radio terminal UE" as appropriate.

The radio terminal UE analyzes a signal received from a radio base station BS to which the radio terminal UE is connected and periodically transmits feedback information in accordance with the result of analysis to the radio base station BS to which the radio terminal UE is connected. In the LTE standard, the feedback information includes the aforementioned CQI. The radio base station BS performs transmission power control, adaptive modulation control and frequency scheduling or the like on the basis of the CQI received from the radio terminal UE.

In this embodiment, new feedback information called an RIC (Radio Information Channel) is defined in addition to the CQI. The RIC will be described later in detail.

(2) Detailed Configuration of Radio Communication System

Next, a description will be given of a detailed configuration of the radio communication system 10 in the order of (2.1) Configuration of Radio Terminal, (2.2) Configuration of Radio Base Station and (2.3) Configuration of Controller Device. Note that, a description will be mainly given of the configurations related to the present invention hereinbelow.

(2.1) Configuration of Radio Terminal

Figure 3:
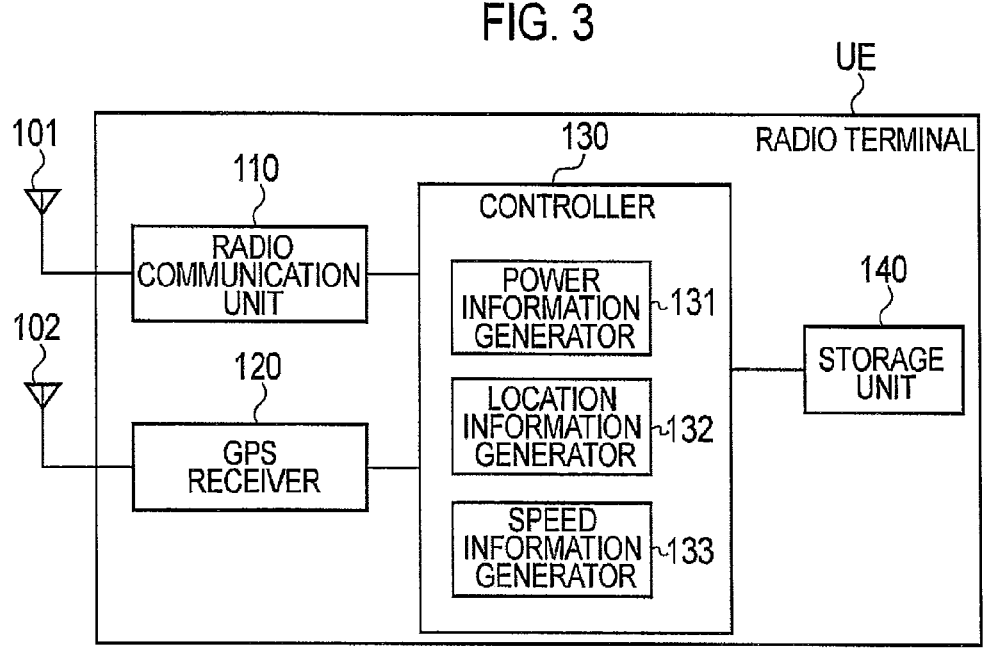
FIG. 3 is a functional block diagram showing a configuration of a radio terminal according to the embodiment of the present invention.

FIG. 3 is a functional block diagram showing a configuration of a radio terminal UE.

As shown in FIG. 3, the radio terminal UE includes a radio communication unit 110, a GPS receiver 120, a controller 130 and a storage unit 140.

The radio communication unit 110 is configured to transmit and receive a radio signal via an antenna 101. The GPS receiver 120 is configured to receive a GPS (Global Positioning System) signal. The controller 130 is configured of a CPU, for example, and controls various functions of the radio terminal UE. The storage unit 140 is configured to store therein various information pieces used for control or the like in the radio terminal UE.

The signal received from the radio base station BS by the radio communication unit 110 includes a base station ID (cell ID) for identifying the radio base station BS. Upon receipt of a signal coming from a radio base station BS other than the radio base station BS to which the radio terminal UE is connected, the radio communication unit 110 measures the power (arrival signal power) of the signal for each carrier frequency. Note that the radio communication unit 110 may further measure, for each carrier frequency, the power (arrival signal power) of the signal coming from the radio base station BS to which the radio terminal UE is connected.

The controller 130 includes a power information generator 131, a location information generator 132 and a speed information generator 133.

The power information generator 131 is configured to generate power information indicating the arrival signal power measured for each carrier frequency by the radio communication unit 110. The power information includes a value indicating the arrival signal power measured for each carrier frequency by the radio communication unit 110 and a base station ID for identifying the radio base station BS which is the transmission source of the arrival signal.

The location information generator 132 is configured to generate location information indicating a geographical location of the radio terminal UE on the basis of a GPS signal received by the GPS receiver 120. The speed information generator 133 is configured to generate speed information indicating the moving speed of the radio terminal UE on the basis of the location information generated by the location information generator 132. The amount of change in the location of the radio terminal UE per unit time can be used as the speed information, for example.

The radio communication unit 110 forms a terminal transmitter configured to send the radio base station BS to which the radio terminal UE is connected, the RIC including the power information generated by the power information generator 131, the location information generated by the location information generator 132 and the speed information generated by the speed information generator 133.

The timing at which the radio communication unit 110 transmits the RIC (location information, power information and speed information) to the radio base station BS to which the radio terminal UE is connected may be the same as the timing of transmission of the CQI or may be different from the timing of transmission. The radio communication unit 110 and the controller 130 may be configured to transmit the RIC upon request for transmission of the RIC from the radio base station BS to which the radio terminal UE is connected, for example.

(2.2) Configuration of Radio Base Station

Figure 4:
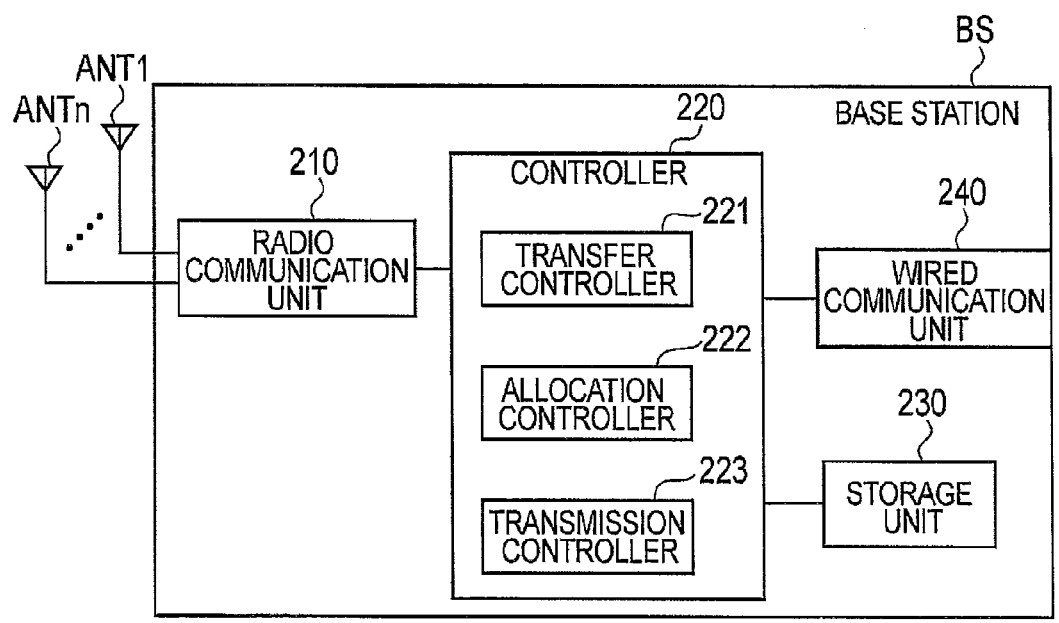
FIG. 4 is a functional block diagram showing a configuration of a radio base station according to the embodiment of the present invention.

FIG. 4 is a functional block diagram showing a configuration of the radio base station BS.

As shown in FIG. 4, the radio base station BS includes multiple antennas ANT 1 to ANT n (n≥2), a radio communication unit 210, a controller 220, a storage unit 230 and a wired communication unit 240.

The radio communication unit 210 is configured to transmit and receive a radio signal via the antennas ANT 1 to ANT n. The radio communication unit 210 in this embodiment forms a base-station receiver configured to receive the RIC (location information, power information and speed information) from the radio terminal UE.

The antennas ANT 1 to ANT n are formed as an array antenna or sector antennas. In a case where the antennas ANT 1 to ANT n are formed as an array antenna, a directional beam is formed by using the antennas ANT 1 to ANT n. In a case where the antennas ANT 1 to ANT n are formed as sector antennas, the antennas ANT 1 to ANT n have their transmission directivities in different directions, respectively.

The controller 220 is configured of a CPU, for example, and controls various functions of the radio base station BS. The storage unit 230 is configured of a memory, for example, and stores therein various information pieces used for control or the like in the radio base station BS. The wired communication unit 240 is connected to the controller device 300 via a wired communication network.

The controller 220 has a transfer controller 221, an allocation controller 222 and a transmission controller 223.

The transfer controller 221 transfers the RIC received from the radio terminal UE by the radio communication unit 210 to the controller 300 via the wired communication unit 240. The transfer controller 221, for example, temporarily stores the RIC received from the radio terminal UE in the storage unit 230, and then collectively transfer multiple RICs stored in the storage unit 230 to the controller device 300 as an RIC report. In this embodiment, the wired communication unit 240 forms a base-station transmitter configured to transmit the RICs to the controller device 300.

The allocation controller 222 is configured to allocate a channel to the radio terminal UE. The allocation controller 222 allocates, for example, a carrier frequency with which the radio terminal UE is less affected by the interference from an adjacent base station to the radio terminal UE, on the basis of the CQI received from the radio terminal UE by the radio communication unit 210.

The transmission controller 223 is configured to control, for each carrier frequency, the transmission power of a signal to be transmitted to the radio terminal UE, on the basis of the CQI received from the radio terminal UE by the radio communication unit 210 and control information received from the controller device 300 by the wired communication unit 240. The control information will be described later in detail.

The transmission controller 223 is also capable of controlling the directivity of the antennas ANT 1 to ANT n. In a case where the antennas ANT 1 to ANT n are formed as an array antenna, the transmission controller 223 weights the signals transmitted from the antennas ANT 1 to ANT n, respectively, and thereby dynamically changes the direction in which the directional beam is directed. In a case where the antennas ANT 1 to ANT n are formed as sector antennas, the transmission controller 223 controls the transmission powers of the signals transmitted from the antennas ANT 1 to ANT n, respectively. The sector antennas are antennas having their static transmission directivities in different directions, respectively.

(2.3) Configuration of Controller Device

Figure 5:
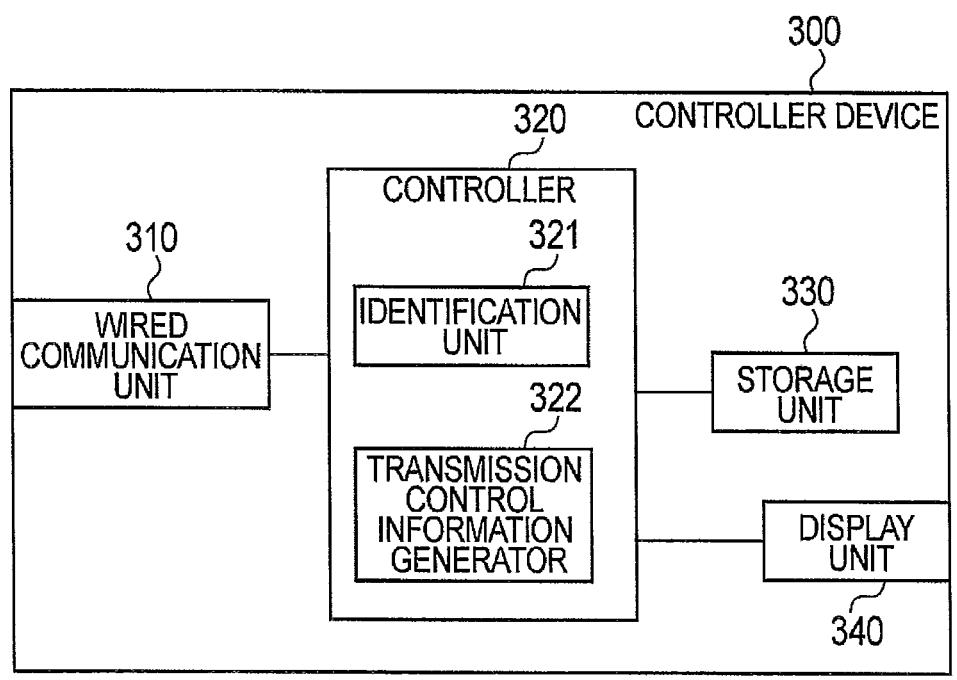
FIG. 5 is a functional block diagram showing a configuration of a controller device according to the embodiment of the present invention.

FIG. 5 is a functional block diagram showing a configuration of the controller device 300.

As shown in FIG. 5, the controller device 300 includes a wired communication unit 310, a controller 320, a storage unit 330 and a display unit 340.

The wired communication unit 310 is connected to the radio base stations BS via a wired communication network. The wired communication unit 310 in this embodiment forms a controller receiver configured to receive the RICs (location information, power information and speed information) from the radio base stations BS.

The controller 320 is configured of a CPU, for example, and controls various functions of the controller device 300. The storage unit 330 is configured of a memory, for example, and stores therein various information pieces used for control or the like in the controller device 300. The display unit 340 is controlled by the controller 320 and is configured to display the various information pieces.

The controller 320 has an identification unit 321 and a transmission control information generator 322.

The identification unit 321 is configured to identify an interference location and an interference frequency on the basis of the RICs (location information, power information and speed information) received by the wired communication unit 310. The interference location is the location where the arrival signal power from a different radio base station BS becomes equal to or greater than a predetermined value in the communication area of the radio base station BS. The interference frequency is the carrier frequency of the arrival signal at the interference location from the different radio base station BS.

The identification unit 321 may identify the location where the moving average of the arrival signal powers is equal to or greater than a predetermined value as the interference location. To put it more specifically, the identification unit 321 calculates an average value of the arrival signal powers in a certain passed period of time and thereby identifies the location where the average value becomes equal to or greater than the predetermined value as the interference location. In addition, the identification unit 321 identifies the interference source radio base station BS on the basis of the base station ID included in the power information.

When identifying the interference location, the identification unit 321 may weigh the arrival signal powers by use of the speed information included in the RICs. To put is more specifically, the reliability of an RIC from a radio terminal UE having a high moving speed is low. Thus, the higher the moving speed, the smaller the weight coefficient used for multiplication of an arrival signal power. In a case where the weight coefficient is set to 0, this means that the applicable arrival signal power is not used in identification of the interference location and the interference frequency.

The transmission control information generator 322 is configured to generate transmission control information for reducing the arrival signal power related to the interference location and the interference frequency, which are identified by the identification unit 321. The transmission control information is information indicating at least one of the interference location (or direction of the interference location) and the interference frequency, which are identified by the identification unit 321, for example.

The wired communication unit 310 in this embodiment forms a controller transmitter configured to transmit the transmission control information generated by the transmission control information generator 322.

The display unit 340 is configured to display the RICs (location information, power information and speed information) received by the wired communication unit 310 and also to display the information on the interference location and the interference frequency, which are identified by the identification unit 321. Thus, the operator can know the current propagation environment in the radio communication system 10.

(3) Operation of Radio Communication System

Next, a description will be given of an operation of the radio communication system 10 in the order of (3.1) Overall Operation, (3.2) Operation of Radio Terminal and (3.3) Operation of Controller Device.

(3.1) Overall Operation

Figure 6:
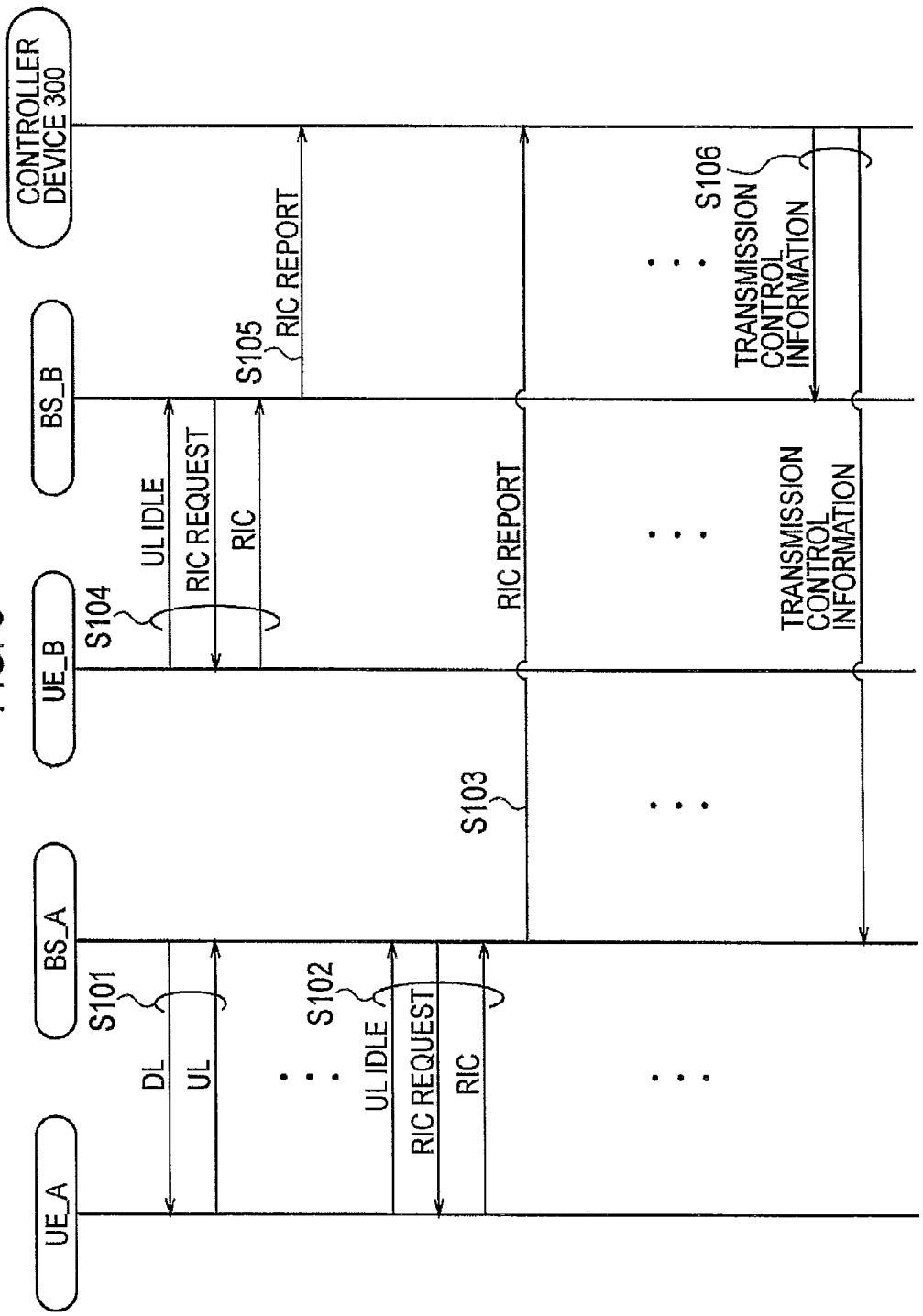
FIG. 6 is a sequence diagram showing an overall operation sequence of the radio communication system according to the embodiment of the present invention.

FIG. 6 is a sequence diagram showing an overall operation sequence of the radio communication system 10.

Here, a description will be given of radio communications between the radio base station BS_A and the radio terminal UE_A and radio communications between the radio base station BS_B and the radio terminal UE_B.

In Step S101, the radio base station BS_A and the radio terminal UE_A perform downlink (DL) communications and uplink (UL) communications.

In Step S102, the radio terminal UE_A transmits a UL idle notification, which instructs interruption of the UL communications, to the radio base station BS_A. Upon receipt of the notification from the radio terminal UE_A, the radio base station BS_A transmits an RIC request for requesting transmission of an RIC to the radio terminal UE_A. Upon receipt of the RIC request from the radio base station BS_A, the radio terminal UE_A transmits an RIC to the radio base station BS_A.

In Step S103, the radio base station BS_A transmits an RIC report for reporting an RIC to the controller device 300.

In Step S104, the radio terminal UE_B transmits a UL idle notification, which instructs interruption of the UL communications, to the radio base station BS_B. Upon receipt of the notification from the radio terminal UE_B, the radio base station BS_B transmits an RIC request for requesting transmission of an RIC to the radio terminal UE_B. Upon receipt of the RIC request from the radio base station BS_B, the radio terminal UE_B transmits an RIC to the radio base station BS_B.

In Step S105, the radio base station BS_B transmits an RIC report for reporting an RIC to the controller device 300.

In Step S106, the controller device 300 transmits the transmission control information to the radio base station BS_A and the radio base station BS_B.

(3.2) Operation of Radio Terminal

FIG. 7 is a flowchart showing an operation flow of the radio terminal UE.

In Step S201, the controller 130 of the radio terminal UE determines whether the radio terminal UE is in the UL idle state where UL communications are to be interrupted or the DL idle state where DL communications are to be interrupted. In a case where the radio terminal UE is in the UL idle state, the processing proceeds to Step S210. In a case where the radio terminal UE is in the DL idle state, the processing proceeds to Step S202.

In Step S202, the controller 130 of the radio terminal UE sets the number of transmission sources BS, which indicates the number of transmission source radio base stations BS of signals received by the radio communication unit 110. In addition, the controller 130 of the radio terminal UE initializes the carrier number, which indicates the carrier frequency of a signal received by the radio communication unit 110.

In Step S203, the controller 130 of the radio terminal UE determines whether the number of transmission sources BS is greater than 1 or not. If the number of transmission sources BS is greater than 1, the processing proceeds to Step S205, and if the number of transmission sources BS is equal to or less than 1, the processing proceeds to Step S204. In Step S204, the processing returns to Step S201 after a randomly set wait time passes.

In Step S205, the radio communication unit 110 of the radio terminal UE measures the power (arrival signal power) of the signal corresponding to the carrier number.

In step 206, the power information generator 131 of the radio terminal UE stores the power (arrival signal power) measured by the radio communication unit 110 in the storage unit 140 in association with the carrier number and the base station ID. Thereafter, the carrier number is incremented by one. The processing in Steps S205 and S206 is repeated until the carrier number reaches the total number of carriers. When the carrier number reaches the total number of carriers, the processing returns to Step S201.

Note that, when the power (arrival signal power) is stored in the storage unit 140, the location information generated by the location information generator 132 and the speed information generated by the speed information generator 133 are also stored in the storage unit 140.

Meanwhile, in Step S210, the controller 130 of the radio terminal UE determines whether the radio communication unit 110 has received an RIC request from a radio base station BS or not. In a case where the radio communication unit 110 has received an RIC request, the processing proceeds to Step S211. In a case where the radio communication unit 110 has not received an RIC request, the processing returns to Step S201.

In Step S211, the controller 130 of the radio terminal UE reads the power information, location information and speed information which are stored in the storage unit 140 and passes these pieces of information to the radio communication unit 110. The radio communication unit 110 transmits an RIC including the power information, location information and speed information to the radio base station BS.

(3.3) Operation of Control Device

FIG. 8 is a flowchart showing an operation flow of the control device 300.

In Step S301, the wired communication unit 310 of the controller device 300 receives an RIC report including at least one RIC from the radio base station BS.

In Step S302, the identification unit 321 of the controller device 300 weights the arrival signal powers in the power information by use of the speed information included in each RIC.

In Step S303, the identification unit 321 of the controller device 300 stores the location information and the weighted power information in the storage unit 330. To put it more specifically, the identification unit 321 stores the location information and the weighted power information in the storage unit 330 for each of the multiple RICs.

In Step S304, the identification unit 321 of the controller device 300 calculates a moving average of the power information stored in the storage unit 330. To put it more specifically, an old piece of information is likely to show the propagation environment different from the current propagation environment, so that the average of the power information for a certain passed period from the current point is obtained.

In Step S305, the identification unit 321 of the controller device 300 determines whether the arrival signal power is equal to or greater than a predetermined value for each of the locations and each of the carrier frequencies on the basis of the location information and the power information which are stored in the storage unit 330. If there is a location or a carrier frequency for which the arrival signal power is equal to or greater than a predetermined value, the processing proceeds to Step S306. If there is no location or carrier frequency for which the arrival signal power is equal to or greater than a predetermined value, the processing returns to Step S301.

In Step S306, the identification unit 321 of the controller device 300 identifies the location where the arrival signal power is equal to or greater than a predetermined value as the interference location, and identifies the carrier frequency for which the arrival signal power is equal to or greater than a predetermined value as the interference frequency. The identification unit 321 of the controller device 300 thus identifies the transmission source radio base station with the arrival signal power equal to or greater than a predetermined value as the interference source radio base station.

In Step S307, the transmission control information generator 322 of the controller device 300 generates the transmission control information for reducing the arrival signal power related to the interference location and the interference frequency, which are identified by the identification unit 321.

In Step S308, the wired communication unit 310 of the controller device 300 transmits the transmission control information generated by the transmission control information generator 322 to the interference source radio base station identified by the identification unit 321.

FIG. 9 is a diagram for describing a specific operation example of the controller device 300.

Here, a description will be given of an operation example of a case where there exist an arbitral radio base station BS_1, as well as a radio base station BS_2, a radio base station BS_3 and a radio base station BS_4 located within a predetermined range from the radio base station BS_1. To put it more specifically, each of the communication areas of the radio base stations BS_2 BS_3 and BS_4 has an overlapping portion with the communication area of the radio base station BS_1.

In FIG. 9(a), the radio base stations BS_1 and BS_2 are illustrated. As shown in FIG. 9(a), the service area formed by multiple communication areas is logically divided into multiple location areas in this operation example. Each of the location areas is given an ID in accordance with a coordinate in X and Y directions (hereinafter, a location ID).

The identification unit 321 of the controller device 300 creates power tables T1 to T4 for the communication area of the radio base station BS_1 on the basis of the RICs as shown in FIG. 9(b). The power tables T1 to T4 are each obtained by associating the arrival signal power of each of the carrier frequencies (carrier numbers) with the transmission source radio base station for each of the location IDs. The identification unit 321 stores the created power tables in the storage unit 330. The power table T1, for example, shows that a signal transmitted from the radio base station BS_2 by use of the frequency of the carrier number 2 arrives with the power "a" in the location area where the location ID is XY. Note that, the power "a" of 0 means that no signal arrives actually.

The identification unit 321 creates a power table for final judgment as shown in FIG. 9(*c*) by performing the weighting process in accordance with the speed information and the moving average process for the aforementioned power tables T1 to T4. The identification unit 321 compares each of the arrival signal powers in the power table for final judgment with a predetermined value and sets the arrival signal power to be a transmission control (transmission power restriction) target when the arrival signal power is equal to or greater than a predetermined value.

(3.4) Transmission Control Operation in Radio Base Station

Next, a description will be given of a transmission control operation in a radio base station BS that has received the transmission control information.

Upon receipt of the transmission control information, the transmission controller 223 of the radio base station BS controls transmission by at least one of methods (a) to (c) below.

(a) The transmission controller 223 reduces on the basis of the transmission control information received from the controller device 300, the transmission power of the signal to be transmitted by using the interference frequency. Alternatively, the transmission controller 223 stops using the interference frequency. In this case, the information indicating the interference frequency identified by the controller device 300 (carrier number, for example) is used as the transmission control information.

(b) In a case where the antennas ANT 1 to ANT n are formed as an array antenna, the transmission controller 223 directs the directional beam formed by the antennas ANT 1 to ANT n (array antenna) to a direction different from the direction of the interference location, on the basis of the transmission control information received from the controller device 300. In this case, the information indicating the interference location identified by the controller device 300 (location ID, for example) or the information indicating the direction of the interference location is used as the transmission control information.

(c) In a case where the antennas ANT 1 to ANT n are formed as sector antennas, the transmission controller 223 reduces the transmission power of the signal to be transmitted by use of any of the antennas ANT 1 to ANT n which corresponds to the direction of the interference location, on the basis of the transmission control information received from the controller device 300. In this case, the information indicating the interference location identified by the controller device 300 (location ID, for example) or the information indicating the direction of the interference location is used as the transmission control information.

Note that, transmission control methods (a) to (c) may be selectively used as appropriate. Transmission control methods (a) to (c) may be selectively used in such a way that one of transmission control methods (b) and (c) are used for a while after the installation of a radio base station BS, and method (a) is used after this period, for example.

(4) Operations and Effects

As described above, the radio base station BS that has received the transmission control information performs transmission control for reducing the arrival signal power related to the interference location and the interference frequency in this embodiment.

To put it differently, the transmission power for each of the carrier frequencies of each of the radio base stations BS is optimized in accordance with the latest propagation environment, or the transmission directivity of each of the radio base stations BS is optimized in accordance with the latest propagation environment. Thus, a change in the propagation environment can be followed and also the interference that cannot be handled by the frequency scheduling using a CQI can be avoided.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the aforementioned embodiments, the location information is generated by use of a GPS. However, the technique for generating the location information is not limited to the technique using a GPS, and an existing technique such as a triangulation method using a radio base station may be used for generating the location information. In addition, the speed information is also generated by use of a GPS in the aforementioned embodiment. However, the technique for generating the speed information is not limited to the technique using a GPS, and a method to estimate the moving speed by use of a fading frequency may be used. Alternatively, the moving speed may be estimated by use of the number of transitions between the communication areas per unit time.

In the aforementioned embodiments, the RIC includes the power information, location information and speed information. However, the RIC may not include all of these three pieces of the information. The speed information may be excluded from the RIC, for example. In addition, instead of including the power information, location information and speed information in the RIC, it is also possible to transmit and receive the power information, location information and speed information separately.

As described above, the present invention naturally includes various embodiments which are not described herein. Accordingly, the present invention should be determined only by the matters to define the invention in the scope of claims regarded as appropriate based on the description.

Entire contents of Japanese Patent Application Publication No. 2009-72471 are herein incorporated by reference.

INDUSTRIAL APPLICABILITY

As described above, the radio communication system, the radio terminal, the radio base station, the controller device and the radio communication method according to the present invention are useful in radio communications such as mobile communications because the interference from an adjacent base station can be avoided even in a case where a change in the propagation environment occurs after the installation of a radio base station or in a case where the allocatable frequencies run short.

The invention claimed is:

1. A radio terminal adopting Long Term Evolution (LTE), comprising:
a transmitter that reports, to a radio base station, a measurement result of received signal powers about a connection target and a neighbor cell as well as location information indicating a location of the radio terminal, in response to a request transmitted from the radio base station based on a notification from the radio terminal, wherein
the transmitter reports a message including the measurement result and the location information which are repeatedly measured during a downlink idle state of the radio terminal before a reception of the request and which are stored until a transmission of the notification.

2. A radio communication method in a radio communication system adopting Long Term Evolution (LTE), comprising:

a step A of reporting, from a radio terminal to a radio base station, a measurement result of received signal powers about a connection target cell and a neighbor cell as well as location information indicating a location of the radio terminal, in response to a request transmitted from the radio base station based on a notification from the radio terminal, wherein in the step A, the radio terminal reports a message including the measurement result and the location information which are repeatedly measured during a downlink idle state of the radio terminal before a reception of the request and which are stored until a transmission of the notification.

3. A processor in a radio terminal adopting Long Term Evolution (LTE), wherein:

the processor reports, to a radio base station, a measurement result of received signal powers about a connection target cell and a neighbor cell as well location information indicating a location of the radio terminal, in response to a request transmitted from the radio base station based on a notification from the radio terminal, and the processor reports a message including the measurement result and the location information which are repeatedly measured during a downlink idle state of the radio terminal before a reception of the request and which are stored until a transmission of the notification.

* * * * *